Patented May 30, 1933

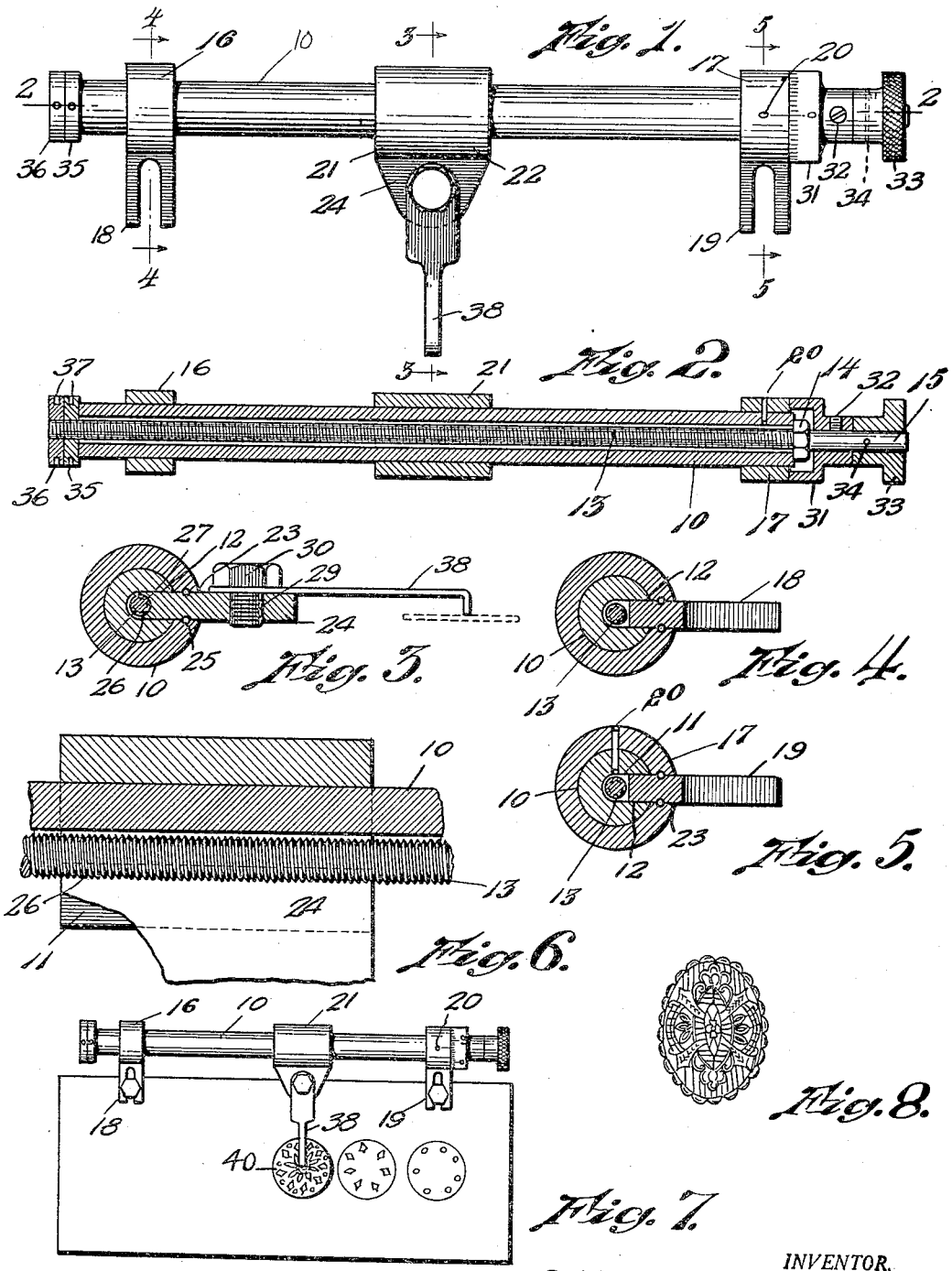

1,912,027

UNITED STATES PATENT OFFICE

ARTHUR H. BARROWMAN, OF ATTLEBORO, MASSACHUSETTS

SPACING TOOL

Application filed January 29, 1930. Serial No. 424,267.

My present invention relates to portable micrometer spacing tools, and has particular reference to tools suitable for die layouts.

One object of my invention is to provide a portable spacing tool that may be clamped to an edge of a die plate blank.

Another object is to provide a portable spacing tool with a micrometer movement.

An additional object is to provide an adjustable micrometer wheel for initial setting.

A further object is to provide take-up means for eliminating back lash and thus increasing accuracy of spacing.

Still another object is to provide a movable micrometer slide with interchangeable tool elements.

With these and other objects and advantageous features in view, the invention consists of novel arrangements of parts more fully disclosed in the detailed description following, in conjunction with the accompanying drawing, and more particularly set forth in the appended claims.

In the drawing:

Fig. 1 is a plan view of the improved spacing tool;

Fig. 2 is a central section on the line 2—2 of Figure 1;

Figs. 3, 4 and 5 are respectively sections of Figure 1 on the lines 3—3, 4—4 and 5—5;

Fig. 6 is an enlarged section detail showing the operating engagement of the micrometer screw and the micrometer slide;

Fig. 7 is a plan view showing the spacing tool clamped to the side of a die plate blank;

Fig. 8 is a plan view of a finished pierced article; and

Fig. 9 is a plan view of an interchangeable drilling fixture suitable for use with the spacing tool.

It has been found desirable in laying out dies for consecutive piercing operations, to accurately space and align the dies on the usual common die plate and thus ensure exact alignment of the successive piercing operations. I have therefore devised a portable micrometer spacing tool; which may be adjusted and clamped securely to an edge of a die plate blank, and which has a fixture carrying slide movable to exact predetermined distances along the die plate edge, whereby an exact spacing of the completed dies may be obtained; and the following is a detailed description of a preferred construction embodying the principles of my invention.

Referring to the drawing, a housing 10, preferably of cylindrical form, is provided with a central recess 11 and a longitudinal slot 12. Within the central recess 11 is positioned a micrometer screw 13, preferably cut from hexagonal stock, with an integral hexagonal nut portion 14 and a cylindrical end 15 at one end thereof.

Two clamping collars 16, 17 which carry clamp fingers 18, 19 are mounted on the housing 10; one collar, preferably the collar 17 adjacent the nut portion 14, is keyed to the housing by a pin 20 or the like, and has a micrometer setting graduation on one or both sides thereof, as desired. A movable fixture carrier slide 21 is mounted on the housing between the collars 16, 17, and includes a cylindrical body portion 22 having a slot 23 and a plate portion 24, the plate portion being secured within the slot 23 by pins 25 or the like, and extending into the slot 12 of the housing 10. The inner end 26 of the plate portion 24 is threaded as at 27 to engage with the micrometer screw 13, and the outer end has a threaded opening 29 to removably receive a bolt 30 for a purpose hereinafter described.

Referring to Figure 2, the cylindrical end 15 of the micrometer screw has a suitably graduated indicator hub 31 mounted thereon and releasably secured thereto by a set screw 32 or the like, and a knurled hub 33 secured to the end by a pin 34 or the like. Two lock nuts 35, 36 are mounted at the other end of the micrometer screw to securely lock the screw within the housing and eliminate end play, the lock nuts having the usual openings 37 to facilitate setting thereof.

A tool fixture such as the finger 38, shown in Figure 3, or the drill jig 39, shown in Figure 9, or any other desired jig or clamp, may be secured to the outer end of the plate portion 24 by the removable bolt; the tool fixture may be elevated vertically, when necessary, by using a longer securing bolt and a washer or washers.

The operation of my improved micrometer spacing tool will now be explained, with particular reference to Figures 7 and 8.

To produce an intricate pierced metal article such as shown in Figure 8, having closely adjacent piercings, it is necessary to subject the article to successive piercings, and the successive dies must be in exact alignment and exactly spaced apart. The improved spacing tool is therefore clamped to one side of the die plate blank, as shown in Figure 7. The collar 16 being moved so that the tool is securely braced. The finger 38 may have a master guide or body 40 soldered thereto, as shown in Figure 7, and may be accurately positioned at desired spacings by rotating the knurled hub 33, the indicator hub 31 being released first if desired to set the indications thereon at zero. My preferred threading for the micrometer screw is 40 turns to the inch, and my preferred graduations on the hub 31 number 50; the desired spacing is therefore obtained within a small fraction of a thousandth of an inch, since the threading and the hub graduating may be very exact.

The improved tool may also be used as a drill jig, or for other operations such as die sinking, marking, scoring, or the like by replacing the finger with a tool such as a molding clamp of any desired type. Various other uses may suggest themselves to the skilled tool maker; and desired changes in structure and arrangement may obviously be made, within the spirit and the scope of the invention as defined in the appended claims.

I claim:

1. In a portable spacing tool, an elongated housing having a longitudinal slot therein, a fixed collar on said housing, a movable collar on said housing, clamping fingers on said collars, a rotatable screw in said housing, an operating shaft therefor, a threaded fixture carrier slidably mounted in said slot and operatively engaged by said screw, and a graduated collar adjustably mounted on said operating shaft in adjacency to said fixed collar, said fixed collar having a setting indicator.

2. In a portable spacing tool, an elongated housing having a longitudinal slot therein, a clamp member fixed on one end of said housing, a clamp member slidable on said housing, a rotatable screw in said housing and a carrier slidably mounted on said housing and having a threaded fixture holding portion projecting into said slot and in engagement with said screw.

3. In a portable spacing tool, a cylindrical housing having a longitudinal slot therein, a clamp member fixed on one end of said housing, a clamp member slidable on said housing, a rotatable screw in said slot, and a cylindrical carrier slidably mounted on said housing and having a threaded fixture holding portion projecting into said slot and in engagement with said screw.

4. In a portable spacing tool, a cylindrical housing having a longitudinal slot therein, a fixed collar on said housing, a movable collar on said housing, clamping fingers on said collars, a rotatable screw in said housing, an operating shaft therefor, a cylindrical carrier slidably mounted on said housing having a threaded fixture holding portion projecting into said slot and in engagement with said screw, a graduated collar mounted on said operating shaft in adjacency to said fixed collar, said fixed collar having a setting indicator.

In testimony whereof I affix my signature.

ARTHUR H. BARROWMAN.